United States Patent Office 3,780,159
Patented Dec. 18, 1973

3,780,159
PROCESS FOR RECOVERING MANGANESE VALUES FROM LOW GRADE OXIDIZED MANGANESE CONTAINING ORES
Jay Y. Welsh, Catonsville, Md., assignor to Diamond Shamrock Corporation, Cleveland, Ohio
No Drawing. Filed June 23, 1972, Ser. No. 265,588
Int. Cl. C01g 45/02, 45/08
U.S. Cl. 423—49
11 Claims

ABSTRACT OF THE DISCLOSURE

Manganese values are recovered from low grade oxidized manganese containing ore by contacting and leaching the ore with a solution prepared by dissolving and dispersing nitrogen dioxide in an aqueous medium and recovering an impure aqueous manganese nitrate solution. Impurities are removed from the nitrate solution by treatment with an alkaline agent and heat and the treated solution is heated to decomposition temperatures whereby substantially pure manganese dioxide, nitrogen dioxide and water vapor are formed. The nitrogen dioxide and water vapor formed by decomposition can be recycled to dissolve and disperse said materials in the aqueous medium.

BACKGROUND OF THE INVENTION

(1) Field of the invention

This invention relates generally to a process for recovering manganese values from low grade oxidized manganese-containing ores, and more specifically to a process for recovering as high purity manganese dioxide, the manganese content of said low grade unreduced ores.

(2) Discussion of the prior art

A satisfactory process to upgrade abundant low grade oxidized manganese-containing ores to recover manganese dioxide has been investigated for many years. Several investigators have attempted to develop processes based partially or in toto on the chemistry of the following chemical equation:

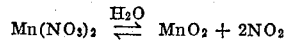

$$Mn(NO_3)_2 \underset{H_2O}{\rightleftharpoons} MnO_2 + 2NO_2$$

The reversible nature of the illustrated reaction which provides a bases for a practical batch, or particularly a cyclic process, was the incentive for the early development work. Failure of the prior investigators to recognize the precise conditions required to optimize the chemistry at critical steps in the process prevented the development of a successful, practical batch or cyclic process based on the reaction shown. The chemistry of the process, in its simplest form, is shown in the following diagram.

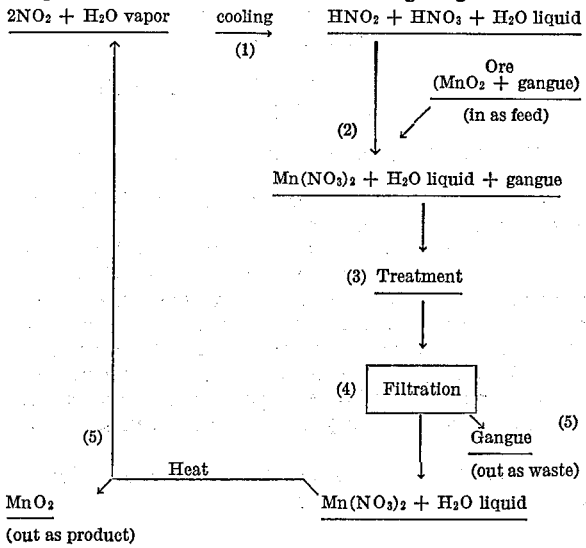

As indicated by the diagram, the process is in theory completely cyclic. Manganese nitrate solution is decomposed by heat to produce a pure $MnO_2$ product and $NO_2$ gas. The $NO_2$ gas along with associated water vapor is condensed under conditions which bring about the formation of nitrous and nitric acids. These in turn react with the $MnO_2$ in crude manganese ore to regenerate manganese nitrate solution. The regenerated solution is separated from the impurities associated with the crude ore by pH adjustment and filtration and then fed to the decomposition unit to repeat the cycle.

The term impure manganese nitrate solution wherever it appears in this specification and claims means manganese nitrate solutions containing soluble impurities and slurries containing manganese nitrate solution and both soluble and insoluble impurities.

U.S. Pat. 1,287,041 to Kaplan is directed to the leaching of $MnO_2$ with $NO_2$ to obtain manganese nitrate which is subsequently decomposed. The exposure of powdered manganese ore to $NO_2$ in the presence of water is described and the use of two or more agitated vessels through which $NO_2$ is passed along with some air is suggested in this patent. The purpose of the air is to formed as a result of the presence of lower oxides of manganese. Kaplan also suggests the possibility of the use of columns of crushed ore through which $NO_2$ is passed along with a water recycle. Although Kaplan does not give sufficient detail to indicate process controls, including pH, for ore leaching he apparently considered NO generation to be a problem and suggested the use of air to convert the NO formed to $NO_2$. Kaplan teaches a batch process for decomposition of manganese nitrate in which a hard massive block of manganese dioxide difficult to "pulverize" was formed. Kaplan's inventive contribution was the provision of a method of adding an alkali nitrate to the manganese nitrate solution prior to decomposition to cause the block of manganese dioxide product to breakdown when boiled with water. The purity and physical characteristics of the final product are not described.

Fox et al. in a report (Technical Paper 674) published in 1945 by the U.S. Department of The Interior, Bureau of Mines, entitled "Semi-pilot-plant Investigations of Nitrogen Dioxide Process for Beneficiation of Manganese Ores," describes a method of leaching low grade manganese ore with $NO_2$ and decomposing the manganese nitrate solution obtained by leaching. Three agitated tanks containing ground ore through which the $NO_2$ passed in countercurrent fashion were utilized. Air was introduced into the gas stream between the second and final tank to reoxidize the excessive NO which has been generated by counter-current leaching. The $MnO_2$ content of the tank into which the $NO_2$ is first introduced is presumably maintained at, or brought to, an acceptably low level so that the contained slurry can be passed on for filtration without excessive $MnO_2$ loss. There is no disclosure in the Fox et al. article of pH control during leaching of the ore. Fox et al. in the report and in U.S. Pat. 2,374,674 describe attempts to decompose manganese nitrate solution by indirect heating. This approach was concluded to be impractical because of objectionable foaming and excessive scaling on the heat exchange surfaces resulting in poor heat transfer. To overcome these problems Fox et al. used a method of heating in which the decomposition products, $H_2O$ and $NO_2$ were recycled through a high temperature heat exchanger and brought back over a shallow pool of manganese nitrate solution. In this way the heat transfer is effected at the surface and the above difficulties are partially avoided. It is to be noted however, that a more detailed discussion of this approach in the above mentioned Bureau of Mines Report mentions scaling within the decomposition vessel and on the rakes employed to remove the product. This type of operation appears to be commercially impractical.

Differences in the overall ore beneficiation process must be taken into account when discussing the relevance of prior patents. Only Kaplan and Fox et al. similarly employ $NO_2$ directly as the leaching agent to regenerate manganese nitrate solution from the raw ore feed. Nossen, U.S. 2,737,441; Laury, U.S. 1,761,133 and Koslov, U.S. 2,779,659, all endeavor to convert the $NO_2$ formed by decomposition of manganese nitrate into nitric acid by a direct oxidation step, generally involving an excess of air. With this approach three separate processing steps are involved in the leaching of the ore instead of one, rendering the overall process much less efficient and more costly. The steps are:

(1) $NO_2$ is oxidized to nitric acid by oxygen or in the presence of water.

(2) Raw ore is reduced in some type of calcining-reduction step from its normal $MnO_2$ level to MnO, or some intermediate lower oxide.

(3) The reduced ore is then leached with the nitric acid to regenerate manganese nitrate solution.

Information concerning the treatment of manganese nitrate solution for the removal of impurities derived from the ore from which it was generated is limited in the literature, especially as such treatment applies to the preparation of a solution for a subsequent decomposition treatment. In the known prior art pertaining to the decomposition of manganese nitrate as a means of generating an upgraded form of manganese dioxide, the decomposition is carried out under extreme temperature conditions to give a massive and relatively impure product.

Laury in U.S. 1,761,133 and Koslov in U.S. 2,779,659 indicate a step in which gangue is removed from regenerated manganese nitrate solution, with no teaching of pH adjustment. Fox et al. in the above-mentioned Bureau of Mines Report, disclose a separation of solid impurities by filtration after a partial neutralization of excess nitric acid by calcium oxide. No specific procedure or pH is disclosed. In U.S. 2,737,441 to Nossen a leaching procedure in which the pH is adjusted to a value of 3.0 before solid impurities are separated by filtration is shown. There is no indication in any of these references of the recognition of a relationship between the impurities present in the manganese nitrate solution and the type of decomposition product which is, or can be, produced.

Koslov, U.S. Pat. 2,779,659 teaches a process for decomposing manganese nitrate solution under pressure in the presence of oxygen with the aim of directly converting the $NO_2$ to nitric acid. In this batch process a massive type of manganese dioxide is formed. Nossen, in U.S. Pat. 2,681,268 describes the decomposition of manganese nitrate solution in a spray dryer. He employed 300 gm./l. manganese nitrate feed solution and spray dryer temperature of 200–300° C. Air was intentionally employed as the gas media in order to oxidize the $NO_2$ to nitric acid. The problem of reclaiming the nitric acid from the relatively large volume of air and the type of manganese dioxide product obtained was not discussed. In U.S. Pat. 2,737,441 Nossen describes the decomposition of manganese nitrate solution on a hot drum in the presence of an excess air sweep. The layer of manganese dioxide formed on the drum is flaked off with a doctor blade in the usual manner and is not in the form of high purity pyrolusite crystals.

Laury, in U.S. Pat. 1,761,133 describes the decomposition of a pre-concentrated "solid" manganous nitrate to manganese dioxide in the range of 120–200° C. He mentions agitation but does not state whether the process is batch or continuous. He does not indicate the physical form of the product or method of heating. The disclosure of the patent is questionable since Laury stated he produced solid manganous nitrate, $Mn(NO_3)_2$ by boiling down neutral solution to a separation of solid manganous nitrate, an impossibility. The known solid forms of manganese nitrate contain several mols of water, e.g., $Mn(NO_3)_2 \cdot 6H_2O$, M.P. 25.8° C. and $Mn(NO_3)_2 \cdot 3H_2O$ M.P. 35.5° C. No anhydrous forms are known to exist in neutral solution and the known solid compositions can be formed only by cooling and not in the boildown process.

The decomposition processes described by the Kaplan, Koslov and Laury patents are so vague and ill-defined as to be meaningless. The methods of decomposition described by both the Fox et al. and Nossen U.S. 2,737,441 suffer from very serious drawbacks. Fox et al. define, in part, problems which must be eliminated to bring about a practical process, i.e., scale formation on heat exchange surfaces, foaming and impurity buildup. In an attempt to circumvent these problems Fox et al. devised a mechanical system requiring very high maintenance and at the same time a system very difficult to seal against loss of $NO_2$. A particularly serious disadvantage was their failure to eliminate caking and scaling. They only succeeded in preventing the scaling from interfering with the required heat transfer. Nossen instead of eliminating undesirable scale simply turned it to his advantage by causing scaling to occur on a heated drum or belt. The scale, or product, was then flaked from the hot surface by means of a doctor blade. This system also requires high maintenance, especially since the manganese dioxide scale is quite abrasive. The system is also difficult to seal against the access of air or the loss of $NO_2$. Nossen of course wanted excess air and therefore swept air into and through the flaking unit. In the process of this invention because of the efficient, direct use of $NO_2$ in the leaching step, the introduction of air or any inert gas must be avoided to maintain equilibrium of the leaching system.

Fox et al. and especially Nossen, prepare the manganese dioxide product under extreme nonequilibrium conditions which cause the inclusion of impurities in the product structure. In addition, the necessity of milling or crushing the products by both Fox and Nossen produces material containing a wide particle size range, including a high percentage of fines, which is difficult to wash and handle.

SUMMARY OF THE INVENTION

It is an object of this invention to provide an improved process for recovering the manganese content of low grade oxidized manganese containing ores by improved contact leaching techniques.

It is another object of this invention to provide a practical process for recovering the manganese content of low grade unreduced manganese bearing ore.

It is another object of this invention to provide a practical economical cyclic process for recovering the manganese content of low grade unreduced manganese bearing ore in the form of high purity pyrolusite crystals.

These and additional objects, details and advantages will become apparent as the following description of the presently preferred embodiments of this invention proceeds.

DESCRIPTION OF THE PREFERRED EMBODIMENTS

Accordingly the process of this invention comprises the steps of:

(a) Dissolving and dispersing nitrogen dioxide and water vapor in an aqueous medium;

(b) Immediately contacting and leaching with the solution of step (a) a quantity of unreduced ore which contains a stoichiometric excess of manganese dioxide in relation to the nitrous acid content of the solution of step (a), at a temperature below about 80° C. and a pH below about 4.0 under an equilibrium partial pressure of a combination of nitric oxide and water vapor less than atomspheric pressurs whereby a slurry containing manganese nitrate is obtained;

(c) Adjusting the pH of the manganese nitrate solution to from about 4.0 to about 5.5;

(d) Heating the solution of step (c) at a temperature from about 70° C. to about 105° C. and filtering the solution;

(e) Combining the solution of step (d) with manganese dioxide to form a slurry;

(f) Vigorously agitating and heating the slurry at a rate of heat input controlled to decompose the manganese nitrate solution and provide free-flowing pyrolusite crystals of manganese dioxide, nitrogen dioxide and water vapor;

(g) Recovering manganese dioxide from the heated slurry and recycling and dissolving and dispersing the nitrogen dioxide and water vapor in the aqueous medium.

The above described process may be carried out batchwise but preferably is conducted by performing all the steps continuously.

To describe the chemical improvement of this invention it is desirable to summarize the various chemical reactions which may be involved, as follows:

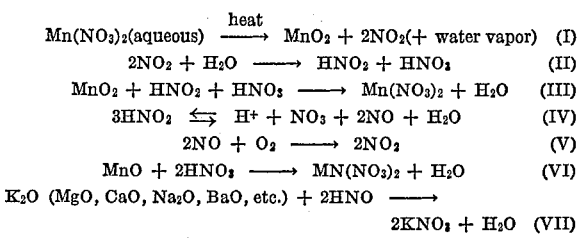

It is apparent that the ideal chemistry for the leaching process is for reactions (II) and (III) to go on simultaneously with the smooth and total conversion of $MnO_2$ to $Mn(NO_3)_2$ with only two moles of $NO_2$. In practice competing side reactions are involved.

In the description of the process of this invention the formation and presence of NO is not considered a problem in itself; in fact NO is a normal, and at controlled concentration, a beneficial component of the leachig system. However, in order to provide an efficient, practical process the uncontrolled, nonequilibrium formation of excessive NO must be avoided. It should be realized that any attempt to oxidize NO with air can not only result in an imbalance of the entire process but also causes an unavoidable loss of active and environmentally harmful nitrogen values to the atmosphere.

The leaching process defined by this invention recognizes the group of reactions indicated as reaction (VII) as unavoidable side reactions which require a clearly defined amount of nitric acid. As will be shown in subsequent discussion, the required nitric acid for reaction (VII) should be added during the leaching step directly as nitric acid.

Reaction (VI) represents a special case which will be hereinafter considered in greater detail. For the purpose of defining the basic concepts of the process of this invention reaction (VI) along with reaction (VII) are considered to occur by the addition of a stiochiometric amount of nitric acid from an external source. Also the leaching process is considered to be carried out in an enclosure which substantially prevents access of air during leaching. In accordance with this analysis, the leaching of the $MnO_2$ component in the ore by means of $NO_2$ is entirely defined by reactions (II), (III), and (IV).

The chemical common to reactions (II), (III) and (IV) is observed to the nitrous acid, and it is in fact the chemistry of nitrous acid which largely defines the critical parameters of the leaching system. Of the three reactions, reaction (IV) is the most critical in terms of defining the leaching conditions. Since reaction (IV) is an equilibrium reaction having an equilibrium constant, K value, of 20 at 20° C. 40 at 30° C. and extrapolated values of 80 and 160 at 40° C. and 50° C. respectively, the partial pressure of NO can be expected to vary with temperature, $H^+$ ion concentration, $NO_3^-$ ion concentration and $HNO_2$ concentration in a predictable manner for a water-based leaching system. With a high concentration of manganese nitrate in solution some shifts in the equilibrium value might be anticipated but an equilibrium will nevertheless still exist in which a relationship can be expected between the vapor pressure of NO, the acid level, temperature and $HNO_2$ concentration. Literature also indicates that the equilibrium rate is rather slow at lower acid levels and at lower temperatures but rapid at higher temperatures and higher acid levels. The general characteristics of reaction (IV) have been substantiated in the case of an aqueous system containing manganese nitrate. Two characteristics of the equilibrium of the reaction in aqueous manganese nitrate solution are of special interest to the process and have been studied in detail, namely the vapor pressure of NO under various conditions and the rate of the reverse reaction as measured by the absorption rate of NO. Data obtained in pilot plant operations indicate the following important generalizations:

(1) Other factors such as temperature, hydrogen ion concentration and nitrous acid concentration adjusted to identical levels the partial pressure of NO increases as the concentration of manganese nitrate increases in the solution. The partial pressure of NO over 30% $Mn(NO_3)_2$ solution is more than double its value over a pure water system.

(2) The reverse rate of reaction (IV) is slower than the forward rate under normal process conditions and highly dependent upon the acid concentration. Thus the rate of absorption of NO is approximately doubled by each 0.5 unit decrease in pH between the pH values of 1.5 to zero. The influence of temperature on the reverse rate is relatively small.

Certain operational parameters are now apparent when the specific characteristics of reaction (IV) are imposed on a practical leaching system involving reactions (II), (III) and (IV), only. It should be stated that a "practical leaching system" implies that reactions (I) and (II) are taking place at a regulated and nominal rate. Also it should be re-emphasized that within the context of the present discussion, the leaching system is presumed to be enclosed, allowing only a negligible access of air and/or loss of NO or $NO_2$ gas. The parameters are:

(1) The $HNO_2$ produced by reaction (II) must be quickly dispersed to avoid high local concentrations. If this is not done the forward rate of Reaction (IV), caused by high local concentrations produces NO faster than it can redissolve in the system as a whole and equilibrium can not be maintained. An uncontrolled, nonequilibrium, continuous production of NO will result.

(2) The pH of the system must be maintained below a value of about 4.0 in order for the reverse rate of reaction (IV) to be significant in maintaining equilibrium of the system.

(3) The $MnO_2$ component of the ore must be present in sufficient stoichiometric excess or have sufficient excess surface area in relation to the nitrous acid content of the leach solution for reaction (III) to take place at a rate which will maintain the concentration of nitrous acid below a critical value as related to a maximum permissible equilibrium vapor pressure of NO.

(4) An upper temperature limit of about 80° C. is indicated for three reasons: (a) the K value of the equilibrium constant is increasing rapidly with temperature permitting smaller and smaller equilibrium concentrations of nitrous acid, and at the same time markedly increasing the partial pressure of NO; (b) The forward rate of reaction (IV) is increasing with temperature permitting a smaller and smaller time interval between the generation of nitrous acid by reaction (II) and its dispersion (see parameter (1) above); and (c) the vapor pressure of water increases rapidly with temperature limiting the permissible partial pressure of NO.

It is to be noted that with the possible exception of parameter (2), above, the limit permitted for any one variable depends in degree upon the limits set for the others. Thus, the rate of dispersal set for parameter (1)

will depend on the temperature limit set in parameter (4) and the minimum excess of manganese dioxide contained in the ore will depend on the pH and temperature.

One limitation can be imposed on the system to help define the above limits. Namely, in order to avoid a pressurized leach system, the sum of the vapor pressure of water over the leaching system plus the partial pressure of NO should not exceed atmospheric pressure. This limitation along with the pH and temperature are the only parameters which can be stated independently with reasonable precision. The temperature should be maintained at an upper limit of about 80° C. and preferably will vary from about 40° C. to about 50° C.

At this point it is appropriate to discuss the effect of the pH of the system on reaction (III). This reaction is an oxidation reduction reaction involving a hydrogen ion and therefore pH dependent. The oxidizing agent is $MnO_2$, the reducing agent is $HNO_2$. Basic thermodynamic data list the oxidation potentials of the two relevant electrode reactions as follows:

$$HNO_2+H_2O=NO_3^-+3H^++2e \quad\quad 0.94\ V.$$
$$MN^{+2}+2H_2O=MnO_2+4H^++2e \quad\quad 1.23$$

Under standard conditions the $\Delta v$ value, the driving force for the oxidation-reduction reaction, is $0.29v$. The oxidation-reduction values under actual process conditions can be approximated as follows:

$$v_{HNO_2}=0.94+\frac{.059}{2}\log\frac{(NO_3)(a_{H^+})^3}{(HNO_2)}$$

$$v_{MnO_2}=1.23+\frac{.059}{2}\log\frac{(a_{H^+})^4}{(Mn^{+2})}$$

where the values of $(NO_3^-)$ and $(Mn^{+2})$ can be approximated as 4.0 and 2.0 respectively for a 30% by weight aqueous manganese nitrate solution and the value of $(a_{H^+})$ can be related to pH. The value of $[HNO_2]$ can be approximated from the steady state process conditions shown in the examples presented hereinafter. For an efficient leaching system in which NO gas is not evolved the $HNO_2$ concentration must be appreciably less than 0.1 gm./l. and probably of the order of 0.02 to 0.05 gm./l. The value of the molar concentration of $HNO_2$ for the purpose of the calculations can be taken as 0.001 M (0.05) gm./l. Using these values the following table was developed from the equations above:

| pH | $(a_{H^+})$ | $a_{HNO_2}$ | $v_{MnO_2}$ | $\Delta v$ (driving force) |
|---|---|---|---|---|
| 0 | 1 | 1.05 | 1.22 | 0.17 |
| 1 | 0.1 | 0.96 | 1.10 | 0.14 |
| 2 | 0.01 | 0.87 | 0.98 | 0.11 |
| 3 | 0.001 | 0.78 | 0.86 | 0.08 |
| 4 | 0.0001 | 0.69 | 0.74 | 0.05 |
| 5 | 0.00001 | 0.60 | 0.62 | 0.02 |

The rough data clearly show the dependence of the critical $\Delta v$ value on acidity. The driving force in the pH range of about 1.0 is about twice that in the pH range of 3.0 and about three times that in the pH range of 4.0. In fact, if successively lower values are taken for the $HNO_2$ concentration, the driving force of the leaching reaction will drop to zero at a pH of 5 and then at 4 etc., indicating that leaching cannot take place with high efficiency at higher pH values.

It is apparent then, that the chemistry of reaction (III) clearly dictates a maximum pH value of about 3 to 4, above which the leaching process will not operate.

The effects of introducing air into the leaching system can now be appropriately considered in conjunction with the leaching system. It was pointed out in the previous discussion that leaching can not take place efficiently until the system reaches a certain level of acidity. Data will be hereinafter presented indicating that a practical rate of leaching cannot be attained above a pH value of about 2. If $NO_2$ gas is introduced into an aqueous slurry of $MnO_2$ ore with no pH control the initial reactions will be (II) and (IV) only, producing the following overall reaction:

$$3NO_2+H_2O\rightarrow 2HNO_3+NO \quad\quad (VIII)$$

Reaction (VIII) is seen to generate nitric acid with a loss of NO. When sufficient excess nitric acid has been produced to lower the pH to an operating level of about 2 or less reaction (III) will begin. As the ore is leached both the MnO and metal oxides contained in the ore will react with the excess nitric acid (reaction (VI) and (VII)) and the system will again revert to reaction (VIII) to reestablish the required nitric acid level.

It is evident then, that in the absence of some additional or outside source of nitric acid for reaction of the metal oxide impurities, NO will be produced irreversibly by the leaching system. If the $MnO_2$ content of the leach tank is lowered by counter-current leaching to the point that there is insufficient excess $MnO_2$ to allow reaction (III) to keep up with reaction (II), then a buildup of nitrous acid will occur and reaction (IV) will in turn produce NO and nitric acid. In other words reaction (VIII) can again become important or even dominant. Therefore while a conventional counter-current leaching system may minimize the loss of $MnO_2$ it will markedly exaggerate the loss of nitrogen values. A third source of NO is possible as a result of the equipment employed. If a sparger tube extending under the surface of the slurry is used to introduce steam and $NO_2$ into the leach tanks, the sparger acts as a cold wall condenser. The $NO_2$ and steam introduced through this sparger partially condenses on the inner surface of the sparger tube producing a liquid film containing very high levels of nitrous acid. Within this liquid film, reaction (VIII) will go to virtual completion. Either of these latter two sources of NO can cause excessive NO generation. The use of air to oxidize the excess nitric oxide to nitrogen dioxide, reaction (V), introduces the inert gas, nitrogen, which will tend to strip or carry NO from the system forcing reaction IV to proceed always in a forward direction and eliminating any possibility of establishing an equilibrium to prevent the irreversible generation of NO.

Without control the temperature of the leach tanks would be expected to approach or reach the boiling point. It has already been pointed out high temperatures speed up the forward rate of reaction (IV) in addition to shifting the equilibrium far to the right. At temperatures near, or at the boiling point, the high vapor pressure of water in conjunction with the associated increase in the partial pressure of NO can cause excessive stripping of the NO, thus disrupting the equilibrium of the system.

For the overall process to balance, each unit weight of manganese nitrate decomposed to $MnO_2$ product and $NO_2$ must be exactly regenerated by the $NO_2$ in the leaching reactions. Any metal nitrates formed from nitric acid generated by the combined reactions (IV) & (V) represent a loss of $NO_2$ from the circuit since the nitrogen values cannot be recovered by alkali nitrate decomposition. It is necessary, therefore to add $NO_2$ to the circuit from an external source in order to maintain an overall leaching-decomposition balance. From a practical point of view $NO_2$ is an economically impractical makeup chemical. The proper solution, as mentioned earlier, is to supply nitric acid as the makeup chemical so that reaction (VII) does not deplete the over-all process of its stoichiometric balance of $NO_2$.

Before defining an optimized leaching system in terms of the previously stated parameters, it is desirable to discuss the special case represented by the reaction of manganous oxide with nitric acid reaction (VI). Unlike reaction (VII) in which nitrogen dioxide cannot practically be regenerated from alkali metal nitrates, the nitrogen values contained in the nitric acid required by reaction (VI) are subsequently reclaimed as $NO_2$. This means that the nitric acid required by reaction (VI) can in fact be generated by a combination of reactions (II), (IV) and (V) without an overall imbalance in the process. In fact the utilization of an outside source of nitric acid for reaction (VI) as was assumed earlier for the sake of more clearly defining the basic parameters, leads to a theoretical imbalance of the process by producing an excess of manganese nitrate solution, usually about 5% of excess but the actual value depends on the oxidation level of the ore. The oxidation of the NO indicated by reaction (V) cannot be efficiently carried out with air because the inert nitrogen in the air strips or carries away NO from the system and the equilibrium reaction (IV) cannot be stabilized. The oxidation can be carried out satisfactorily with pure oxygen however, giving rise to an operational option.

The use of oxygen in an industrial process depends on two general factors, (1) the percentage of lower valence manganese in the ore; if the amount of lower valence manganese were high the use of oxygen might be indicated; and (2) the extent of the manganese nitrate solution losses in the remainder of the process. In any process some material losses usually occur and in the case of the process of this invention losses are almost entirely in the form of manganese nitrate solution. Thus, a certain spillage loss makeup of manganese nitrate solution is usually required. Aside from spillage a portion of the manganese nitrate solution may be lost along with the alkali nitrates as they are removed from the circuit. It is evident then, that the need for extra manganese nitrate for makeup, in conjunction with the grade of the ore, as well as associated economic factors will determine whether or not a portion of the reaction of MnO with nitric acid, (VI), should be brought about with nitric acid produced by the introduction of a controlled amount of pure oxygen into the leaching system.

The leaching system of this invention based on the above-described parameters comprises:

(a) Introducing $NO_2$ and steam from any source or from the decomposition of manganese nitrate solution into an aqueous leaching media preferably containing manganese nitrate, in such a way that the nitrous acid formed is rapidly dispersed throughout the liquid media to avoid high level concentration gradients;

(b) Immediately contacting and leaching with the solution of step (a) the $MnO_2$ content of the ore undergoing leaching, while maintaining sufficient excess ore (sufficient ore surface area relative to the dynamics of the system) to maintain a sufficiently low concentration of nitrous acid so that the equilibrium partial pressure of NO is controlled within a range between about 20 mm. of Hg and about 200 mm. of Hg, the practical upper limit of the combined NO partial pressure and the vapor pressure of water over the leach slurry being less than one atmosphere, i.e., below atmospheric pressure;

(c) While controlling the temperature of the leach slurry below about 80° C. and preferably within a range from about 30° C. to about 55° C. and the pH between about 0.5 to about 1.5 with an upper limit of preferably about 3.0; and (d) Controlling the concentration of the manganese nitrate in the aqueous leaching system preferably between about 25% to about 35% manganese nitrate by weight and generally less than about 50% by weight.

The atmosphere above the surface of the liquid leaching media should be confined to prevent the access of air and/or the loss of NO or $NO_2$. From a practical engineering viewpoint this enclosure should not be pressurized although theoretically a pressure system could be employed. If a pressurized enclosure were used the limitation of less than atmospheric pressure indicated for the sum of the NO partial pressure and the vapor pressure of water and the upper temperature limit could be appropriately revised and the pressure increased accordingly.

In general the controls required can be maintained by conventional means. Cooling coils or a heat exchanger is a satisfactory means of temperature control; a pH meter in conjunction with an acid pump can be used to maintain the pH range and other conventional control techniques are obvious.

The mechanical means to accomplish the requirements of steps (a) and (b) however require detailed comment. The requirement of step (a) that the nitrous acid from the reaction between $NO_2$ and water be immediately dispersed throughout the aqueous leaching media clearly suggests some type of agitated system as the most plausible means of dispersion. If an agitated tank is assumed there still remains the problem of introducing $NO_2$ and steam into the agitated liquid slurry of the tank. It is to be understood that any area of the gas conveying system which serves as a cold wall condenser causes excessive generation of NO. If a sparger system is to be used the sparger walls must either be insulated against heat transfer or the non-insulated sparger tube must enter through the side of the tank. In either case the introduction of the gases beneath the liquid surface requires that the gases must be generated under pressure or delivered by means of a blower. There is also the problem of withdrawal of the slurry by a suction effect due to the collapse of the $NO_2$ and $H_2O$ vapors. All of these features are unattractive from an engineering point of view. A far more desirable solution is to employ a contact condenser as a means of bringing the gases into contact with the liquid media of the leaching system. If the liquid leaching media is recycled through the contact condenser at a high flow rate the concentration and temperature gradients within the contact condenser can be kept very low, and if the condenser discharges immediately into the agitated tank the time interval to total dispersal of the condensate within the agitated tank is negligible. The contact condenser eliminates the cold wall condenser problem as well as any pressure problems. Any piping carrying the $NO_2$ and steam should be insulated to prevent condensation on the walls. A secondary advantage of using the contact condenser for the introduction of the $NO_2$ and steam into the aqueous leaching system is that a heat exchange unit for the temperature control of the leaching system can be incorporated into the recycle steam going through the contact condenser.

From the point of view of equipment and general processing techniques the requirements of reaction (III), $MnO_2 + HNO_2 + HNO_3 \rightarrow Mn(NO_3)_2 + H_2O$, and the equilibrium conditions of reaction (IV),

will generally be met simultaneously. A practical factor is involved here which has not been mentioned as a part of the critical chemical controls of the process, namely that the solution contained in the leaching system which bears the regenerated manganese nitrate solution must be removed or passed on to the other steps of the process without incurring an appreciable loss of unleached ore. The preferred solutions to the problem will be treated differently for various categories based on the physical character and cost of the raw ore employed. The simplest solution is based on very low cost ore which occurs naturally in a finely divided state. The preferred leaching system unit consists of one large tank equipped with slurry agitation means coupled to one or more contact condensers which discharge totally into the tank. The leaching is preferably carried out on a continuous basis. If the tank is sufficiently large it can contain sufficient excess ore to sustain a suitable reaction rate in the presence of a relatively small amount of unreacted ore per unit volume. The ore losses as the leaching slurry is advanced to the next step of the process is therefore minimized. Thus in an actual experimental run using minus 200 mesh ore (76% $MnO_2$) a leaching rate of 5,000 pounds of $MnO_2$ product per day was attained in a 2500 gallon leach tank, or two pounds of $MnO_2$ product per gallon of leach slurry per day with an unreacted ore concentration corresponding to 0.165 pounds of $MnO_2$ per gallon. Since the concentration of manganese nitrate in the leach slurry was 30% by weight, corresponding to 1.59 pounds of product $MnO_2$ per gallon, only 10.4% of the ore feed is lost as unreacted residue from the leach tank. This loss is not excessive for a very low cost ore. The other critical factors maintained during the experimental run were a temperature of 45° C. and a pH of about 1.0 to about 1.3. The leaching efficiency with respect to $NO_2$ was in excess of 99.8 percent.

In the event that the raw ore is finely divided in its natural state but of sufficient value that a 10 to 12 percent loss is considered unacceptable, another leaching system is preferred. In this case the leaching system unit consists of two or three agitated tanks, each equipped with a contact condenser as described above. The tanks should be of nominal size and batch operated in tandem, not counter-current. The flow of the decomposition gases should be divided, with the major portion of the decomposition gases passing to the tank of the series freshly charged with raw ore. The second tank, or other two tanks, are then "polished off" with a decreasing proportion of the total flow of the decomposition gases until a suitable level of residual $MnO_2$ is attained. In this manner an ore leaching efficiency of 97 percent, or better, can be obtained.

If the raw ore is not finely divided in its natural state, fine grinding represents an undesirable expense. Crushing ore to a maximum size of about 10 to 12 mesh, on the other hand, is a relatively inexpensive procedure. A leaching system has been designed to employ such a crushed ore as a feed without jeopardizing the critical chemical controls. The leaching system unit in this case, as in the first case, consists of a single agitated tank equipped with one or more contact condensers. The leaching is also carried out on a continuous basis. The internal construction of the tank and agitator are not conventional however and require a detailed description.

There are two basic problems involved in this case which must be circumvented by appropriate equipment modifications. One is that the coarse 10–12 mesh ore particles are very abrasive and can cause excessive wear on a heat exchanger or even on cooling coils. The other problem concerns the low surface area to weight ratio of the coarse particles. The degree of excess ore required to maintain reaction (III) at an efficient rate is actually a function of the surface area of the ore rather than its weight. In the case of the coarser ore therefore the weight of ore contained in the leach tank must be many times that of fine ore in order to maintain the same reaction rate. Further, because of their low surface area, the largest particles in the ore feed will tend to accumulate in the leach tank so that the excess ore contained in the leach tank will have a coarser particle size distribution than the feed material. The tank design concept to accommodate these features is one which incorporates a quiescent settling zone or quiet box from which the stream to the recycle and to the heat exchanger and contact condenser flows. The advance of the leach solution to subsequent process steps is also removed from this quiet zone. This concept forces the coarse, unreacted and abrasive ore particles to remain in the agitated portion of the leaching system. In addition to the quiet box, the design concept can be implemented by adjusting the tank shape and impeller design to produce a high agitation zone near the bottom of the tank and a relatively quiet zone near the top. This modification must also incorporate a tube which permits the discharge from the contact condenser to be fed directly into the intense agitation zone. The leaching system then operates as follows:

Crushed ore, approximately 10 mesh by down, is fed into the leach tank. The coarser fractions settle out of the quiescent zone in the top of the tank but remain in suspension and agitation in the bottom zone. A relatively large excess of ore is maintained under agitation in the bottom of the tank at all times so that as the stream from the contact condenser is brought into contact with the ore the $HNO_2$ concentration will be quickly reduced to a near equilibrium level. The fine fractions from the feed tend to remain in suspension in the upper portions of the tank, but because of their high surface area they react quickly with the residual $HNO_2$ remaining after the main reaction in the bottom portion of the tank so that the top portion of the tank is substantially free of suspended $MnO_2$ containing ore particles. The top portion of the tank will, however, carry all of the gangue in suspension since these solids are extremely fine.

The streams to the heat exchanger and the contact condenser are removed from the top portion of the tank so that no difficulty will be encountered with abrasive or line plugging solids. The advance of the regenerated $Mn(NO_3)_2$ solution is also removed from the top portion of the leach tank, conveniently by simple overflow, and will carry with it virtually no unreacted $MnO_2$ particles.

Beyond the systems already mentioned a wide variety of physical modifications of the leaching system are feasible. For example, it might be possible to operate a tank equipped for agitation, contact condenser and heat exchanger unit in conjunction with columns of coarse crushed ore. The agitated leach solution could then be recycled from the tank through the ore columns. However, regardless of the equipment employed, the chemical controls described hereinabove must be incorporated if the leaching process is to attain a practical level of efficiency.

To adequately define a practical leaching process it is essential to include a discussion of an optional small back-up leaching circuit. This small circuit plays the role of a gas scrubbing system. It is desirable to maintain the top enclosure of the main process leaching system at a slightly negative pressure, about one inch of water for example, so that any leaks around the agitator shaft packing glands or similar seals cannot release nitrogen oxides into the atmosphere. Any deficiency in the various seals will therefore cause a slight amount of air to be pulled into the system. Another source of air is from ore feed. Even though the ore feed into the leaching system may be introduced through a liquid trap, the air contained within the voids of the particulate ore mass can still be carried into the leaching system enclosure. Because of these various sources of air, there is a small amount of stripping of the NO from the leaching system. This small flow of NO can be effectively removed from the inert gas stream in which it is carried by the use of a specifically designed leaching circuit. This gas scrubbing leaching circuit, in order to be effective, must normally operate under a different set of chemical parameters than the main leaching circuit as follows:

high liquid surface area for gas contact, e.g., a scrubbing tower a large excess of finely divided manganese dioxide, with good agitation a pH of less than about 0.5 relatively low manganese nitrate concentration moderate temperatures of about 25° C. to about 35° C.

Under these conditions the concentration of nitrous acid will be essentially zero at all times and the NO will be readily absorbed. The chemistry within the "scrubber" is best represented by the equation

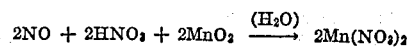

The manganese nitrate solution removed from the scrubbing leach system can of course be returned to the main leaching system to avoid the loss of manganese or nitrogen values.

In order to produce a high purity, crystalline manganese dioxide product in particulate form from the manganese nitrate solution obtained by ore leaching, it has been found essential to remove certain acid soluble impurities which interfere with the crystal growth of the $MnO_2$.

It has been determined that aluminum is one of the common impurities present in manganese ore which can be solubilized in the leaching step and if not adequately removed by proper treatment can prevent the growth of well defined manganese dioxide crystals in the subsequent decomposition of the manganese nitrate solution. The effect of aluminum contamination on the decomposition step in an agitated system can be summarized as follows:

| Item | Properly treated feed solution | Improperly treated feed solution |
|---|---|---|
| Decomposition temperature. | 139–146° C. (depending on rate of decomposition). Stable conditions within range, smooth continuous decomposition. | 145–158° C. Unstable conditions. Decomposition will initiate at high temperature, the temperature will then fall. When temperature approaches lower range decomposition will again cease, and the cycle will repeat. |
| Product | Well defined "sugary" crystals about 80% plus 200 mesh. Very easy to separate from full strength mother liquor. | Very fine particles, low degree of crystallinity. Over 95% less than 300 mesh. Very difficult to separate from mother liquor. |
| Commercial feasibility. | Practical | Impractical. |

The maximum level of aluminum solubility which can be permitted in the manganese nitrate solution is about 600 p.p.m. and for practical operation the level should be maintained below 220 p.p.m. It has been found that the pH of the regenerated manganese nitrate solution must be adjusted to a value from about 4.0 to about 5.5 in order to adequately control the amount of soluble aluminum. Preferably the pH is adjusted from about 4.5 to about 5.0 to substantially remove aluminum impurities.

Since the aluminum and other impurities contained in the regenerated manganese nitrate solution must be removed as solids by filtration it is essential that collodial type precipitates such as aluminum hydroxide and ferric hydroxide are in a suitable physical form. It has been found that heat as well as pH adjustment is essential to prepare the leach slurry for filtration. The purpose of the heat is to flocculate the collodial type of precipitates obtained. A temperature range of from about 70° C. to about 105° C. is satisfactory, and a temperature from about 90° C. to about 100° C. is preferred in combination with the specified pH for satisfactory removal of impurities, including aluminum, from impure manganese nitrate solution.

In the process of this invention the decomposition of the manganese nitrate solution is controlled in such a way that:

(a) The $MnO_2$ product is composed of free flowing pure pyrolusite crystals of reagent quality, within a size range from about 300 mesh to about 60 mesh with about 80 percent of the particles between 200 mesh and 80 mesh, (b) No scale, flakes or lumps of decomposition product are produced, (c) Soluble impurities from the ore are conveniently removed with a mother liquor bleed-out, (d) The decomposition gases are removed without danger of leaks or air contamination in the leaching circuit, (e) The decomposition is continuous and very efficient with respect to material losses as well as heat conservation, (f) The equipment is simple, conventional and virtually maintenance free.

The conditions of this invention specified for decomposition of manganese nitrate are based on the simple and logical principle that the decomposition reaction should be carried out under conditions as near to equilibrium as possible. The generalized conditions which tend to promote equilibrium in a two phase system of this type are well known and can be summarized as follows:

(A) good agitation to prevent high concentration and thermal gradients, (B) high solid to liquid interface area (C) controlled with uniform heat exchange rate (D) with respect to continuous processing, stable and uniform rates of feed input and product removal.

The characteristics of the decomposition of manganese nitrate solution have been thoroughly studied and it has been found that certain superficial similarities exist to a conventional crystallization system. The feature of particular interest here is a phenomenon similar to super-saturation. In commercial crystallization equipment, advantage is taken of the super-saturation feature in that a controlled degree of super-saturation can be brought about in an incremental volume of solution as it is briefly exposed to a heat exchange surface without inducing immediate crystallization on the heat exchange surface itself. The super-saturated solution subsequently comes to equilibrium slowly in the body of the crystallizer by the growth of crystals under near-equalibrium conditions.

Contrary to the high decomposition temperatures indicated in the literature, decomposition in an equilibrium system occurs at about 137° C. and a smooth practical decomposition rate can be attained in the range of 138 to 142° C., indicating a small but significant degree of super-heating. In the absence of an equilibrium solid phase consisting of free flowing pyrolusite crystals having active clean crystal surfaces, decomposition may not begin until temperatures as high as 158 to 160° C. are reached. Once decomposition has started and a solid manganese dioxide phase has been developed the system is capable of quickly adjusting back to a normal decomposition temperature.

It is evident that from an operational point of view, the super-heating of manganese nitrate solution at about its equilibrium decomposition point is similar to the super-saturation in a conventional crystallization system, and an effort to carry out the decomposition under near-equilibrium conditions leads to the same type of operational features. Thus, a degree of super-heating of an increment of the manganese nitrate solution can occur upon a brief exposure to a heat exchange surface without immediate decomposition on the heat exchange surface, and the decomposition can be caused to occur subsequently in the body of an agitated system under near-equilibrium conditions.

To establish such a system it is necessary to (a) maintain a slurry of manganese dioxide crystals within the decomposing manganese nitrate solution, (b) maintain a high degree of slurry movement past the heat exchange surfaces and (c) control the rate of heat input so that the degree of super-heating is controlled within the metastable temperature range of about 138° C. to 160° C.

In addition to the above, two special restrictions should also be imposed which result from the particular characteristics of the manganese nitrate-manganses dioxide system. One of the important restrictions is that the heat exchange surfaces must be below the liquid level at all times. If the heat exchange surfaces extend above the slurry. It has been found that high solid levels cause the the solution line. A second control, concerns the percent of solid manganese dioxide contained in the decomposing slurry. It has been found that high solid levels cause the generation of excessive fines due to the grinding action of one particle against another. In this respect it is desirable to maintain the percent solids at less than about 25 percent.

Decomposition system equipment suggested by the above criteria include a simple vessel equipped with an agitator and either jacketed or equipped with a heating coil. It must of course have a top enclosure to control the evolved $NO_2$, and the heat exchange surface must be below the normal liquid slurry level. A means must be provided for the addition of new manganese nitrate feed solution and also a means of removing product and venting the gases to the leaching system. In order to effect a uniform and high speed sweep of slurry past the heat exchange surfaces a jacketed tank is preferred over the use of coils.

The control of the impurities within the decomposition steps of the process requires clarification as it relates to the overall beneficiation of the raw ore. It has been pointed out that impurities contained in the raw ore are removed subsequent to the leaching step by pH adjustment heating and filtration. Although this step removes the bulk of the ore impurities, such as silica, alumina, phosphorous, heavy metals, iron and the like, ay alkali or alkaline earth oxides contained in the ore will remain in the manganese nitrate solution as soluble nitrates. In the current, abundantly available, lower grade ores (35–45% Mn) the amount of soluble impurities is relatively low and present almost entirely as potassium oxide. The maximum weight ratio of potassium to manganese ions in these ores is about 1 to 20. It has been found that relatively high percentages of potassium nitrate do not interfere with the decomposition of manganese nitrate nor with the reagent purity of the manganese dioxide product. The weight ratio of potassium to manganese ions in the liquid phase of the decomposition system can be permitted to go as high as about 1 to 1 before the viscosity of the solution begins to interfere with the release of the $NO_2$ gas and water vapor. In the normal operation of the process the potassium would be controlled in the liquid phase of the decomposition system at about one part of potassium to 1 to 3 parts of manganese by a simple bleed out of a portion of the liquid phase of the decomposition slurry. It is evident that the removal of manganese during bleed out under these conditions is about 10 percent of the manganese in the ore feed. It should also be noted that the bleed out solution has reclaim value by any one of several known methods and is of value directly as a fertilizer.

The purity of the product has been pointed out to be reagent quality and results of chemical analyses are shown in Example 3 below. The exceptional quality of the product is clearly the result of the near-equilibrium conditions under which it is generated. The well defined, free flowing uniform and inclusion-free manganese dioxide crystals of pyrolusite structure which are formed as the final product are not only of exceptional purity but greatly facilitate the mechanical operations of filtration and washing which are involved in separating the product from the mother liquor.

In order that those skilled in the art may more completely understand the present invention and the manner in which it may be carried into effect, the following specific examples are presented.

EXAMPLE 1

Leaching parameters were evaluated in an experimental pilot plant operated continuously over a period of several months at a rate of manganese dioxide production of about 5000 lbs./day. Low grade unreduced manganese bearing ore of −200 mesh particle size was introduced into a 2850 gallon enclosed tank equipped with an agitator having a shaft extending through a packing gland in the cover and turbine blades arranged in proximity of the bottom of the tank. The ore was supplied through liquid trapped ore feed openings in the cover at a variable rate. An aqueous solution of manganese nitrate containing dissolved and dispersed nitrogen dioxide and water was introduced through an opening in the tank cover into the ore slurry proximate to the zone of greatest agitation at a rate calculated to provide 5000 lbs./day of manganese dioxide upon decomposition of the manganese nitrate obtained by contact leaching of the ore. The souce of the nitrate leaching solution containing the dissolved and dispersed nitrogen dioxide was a liquid contact condenser equipped with a disc and doughnut contact chamber through which manganese nitrate solution was cycled and into which was fed nitrogen dioxide and water vapor obtained from decomposition of a treated manganese nitrate solution. The manganese nitrate-solution resulting from the dynamic contact leaching of the finely divided ore with the aqueous nitrate-solution containing nitrogen dioxide was maintained at a concentration of about 30 percent by weight $Mn(NO_3)_2$ by addition of water and removal of the solution from the tank. The nitrate solution obtained by leaching was removed from the tank from an internal quiet box positioned in the upper portion of the tank, as an overflow stream resulting from the introduction of the ore and aqueous nitrate solution containing the dispersed nitrogen dioxide. About 200 gallons/minute of the overflow solution was conducted to a heat exchanges and then through the chamber of the condenser for contacting and condensing the hot nitrogen dioxide and water vapor received by the condenser from the decomposition of the treated manganese nitrate solution. The balance of the overflow nitrate solution was conducted to a treatment tank for removal of impurities and subsequent decomposition. Make-up nitric acid required to react with and solubilize metal oxide impurities contained in the ore and to maintain equilibrium reaction conditions was added as required for such purposes to the overflow stream conducted to the condenser. The condenser was provided with a vent pipe connected to a scrubbing and exhaust system which was designed to maintain a negative pressure on the top enclosure of the leach system of about one inch of water and an air sweep of about one ft.$^3$/minute through the top enclosure of the leach tank resulting from leakage of the packing glands and seals positioned in the top cover.

A constant rate of input of nitrogen dioxide and water vapor from the decomposition of manganese nitrate solution obtained by previous contact leaching of ore was established at a level calculated to produce about 5000 lbs./day of manganese dioxide final product. The concentration of manganese nitrate solution was maintained at about 30 percent by weight of manganese nitrate in the leach tank.

The above noted parameters were maintaining constant and the temperature, pH, and the amount of ore in excess of the nitrous acid content of the slurry were varied to determine suitable practical operating parameters for the contact leaching of the ore. The failure of the leaching system was evidenced by loss of nitrogen dioxide from the outlet of the scrubber exhaust system. The partial pressure of nitric oxide and water vapor in the space above the slurry level in the leach tank was monitored by chemical analysis of gas samples removed from the tank.

The following ranges of the parameters of the process were maintained during the leaching system operation:

Ore in stoichiometric excess of the nitrous acid content of the slurry—35 g./l. to 50 g./l. of slurry of minus 200 mesh uniformly mixed ore. Greater quantities may be used but are not beneficial and consequently objectionable pH—0.8 to 1.2

Temperature—40° C. to 50° C.

Process parameters were studied by maintaining two of the parameters constant within the above ranges while varying a single parameter. Loss of equilibrium conditions was evidenced by nitrogen dioxide escaping from the scrubber outlet under the following conditions:

Ore in stoichiometric excess of nitrous acid content of slurry—less than 10 g./l. of slurry of −200 mesh ore.

pH—3.0 or higher.

Temperature—80° C. or higher.

The partial pressure of nitric oxide and water vapor was found to be from about 50 mm. to about 150 mm. of mercury when all the above parameters were maintained within the specified ranges. As the system approached failure exact values for the partial pressure could not be obtained but were observed to exceed 300 mm. of Hg.

EXAMPLE 2

A 1,000 gallon capacity steam-jacketed tank equipped with a stirrer was filled with the crude manganese nitrate obtained from the leaching system of Example 1. The slurry was heated to about 90° C. and the pH was adjusted to about 4.8 to 5.0 by the slow addition of manganous oxide obtained from a reduced manganese dioxide-containing ore. The slurry was continuously agitated by stirring during the heating and pH adjustment and after about one hour was filtered on a precoated drum filter and the precipitates spray washed.

The above treatment was carried out batchwise but the same treatment may be performed continuously by arranging a number of tanks in series flow.

The treated manganese nitrate solution was then concentrated to about a 55 percent by weight of manganese nitrate prior to decomposition as such concentration is preferred for practical and economical decomposition of said solution.

Average results of chemical analysis of the filtered manganese nitrate solution during the stated period of operation were:

| | | |
|---|---|---|
| Mn | gms./l | 130.0 |
| K | gms./l | 5.5 |
| Fe | p.p.m | 0.9 |
| Cu | p.p.m | 0.6 |
| Cr | p.p.m | 1.0 |
| Al | p.p.m | 2.0 |
| Zn | p.p.m | 7.0 |
| Ni | p.p.m | 5.6 |
| Co | p.p.m | 13.0 |
| Mg | p.p.m | 9.0 |

EXAMPLE 3

The data shown in this example were obtained by continuous operation of a decomposition system for manganese nitrate during a six week period during a several months period of operation of a pilot plant decomposition unit.

At the startup of the unit a concentrated manganese nitrate solution representative of the solution of Example 2 above was introduced into a tank having a six foot six inch diameter and a height of eight feet provided with a high pressure steam jacket over the lower five feet of the sidewall. The jacket provided 98.7 square feet of heat exchange surface. The top of the tank was substantially enclosed with the exception of openings for an agitator shaft, for introducing feed solution, withdrawing gases and removing the manganese dioxide product. A double turbine agitator connected to a 10 H.P. motor was arranged in the tank. Manganese dioxide solid product was added to the solution to provide a total slurry of 1700 gallons in which the solid manganese dioxide content was about five percent by weight. The decomposition step was then operated continuously by feeding the manganese nitrate solution at a rate which provided 1700±200 gallon volume of slurry in which the manganese dioxide solid content was maintained at from 5 to 20 percent by weight of the slurry during the decomposition. Continuous operation in this manner was predetermined to provide from 3500 to about 5500 pounds per day of manganese dioxide product by a controlled rate of heat input. The decomposition temperature ranged from about 140° C. to about 146° C. The manganese dioxide product was continuously removed from the lower portion of the tank and substantially all the mother liquor was returnel to the decomposition tank without dilution. The weight ratio of potassium to manganese ion in the manganese nitrate feed solution was 1:28 and in the mother liquor was maintained at 1:2 to 1:3, by bleeding off the required amount of mother liquor to maintain this ratio. Objectionable foam developed periodically at the surface of the slurry and a silicone type defoaming agent was added to control the objectionable foam. The nitrogen dioxide gas and water vapor formed in the upper portion of the tank was conducted to a liquid contact condenser provided with a disc and doughnut contact chamber and immediately condensed by dissolving and dispersing the gas and water vapor in the manganese nitrate solution conducted to the condenser from the quiet box of the leaching system of Example 1. The manganese dioxide product removed from the decomposition tank was dried by heating at about 110° C. to about 150° C. The manganese dioxide dry product consisted of high purity well defined free flowing uniform and inclusion—free manganese dioxide crystals of pyrolusite structure.

To illustrate the high purity of the manganese dioxide product obtained by the process of this invention a comparison of the analysis of the initial ore introduced into the process and an average chemical analysis of the product obtained during the period of operation of the decomposition system in Example 3 are presented below.

AVERAGE OF PRODUCT ANALYSES

| | Percent by weight |
|---|---|
| Mn | 63.0 ($MnO_2 \rightarrow 99.5$). |
| Fe | 0.03. |
| Al | 0.007. |
| Zn | 0.0001. |
| Cu | 0.0015. |
| Cr | 0.006. |
| Ni | 0.0025. |
| $SO_4$ | 0.05. |
| Insols | 0.02. |
| Co | 0.007. |
| Alk. and Alk earths (as sulfates) | 0.15. |
| $NO_3$ | Less than 0.05. |
| As | Not detected. |
| P | 0.004. |

ANALYSIS OF INITIAL ORE FEED, AVERAGE VALUE, DRY BASIS

| | Percent by weight |
|---|---|
| Mn | 46.4 |
| Fe | 6.3 |
| $Al_2O_3$ | 5.9 |
| $SiO_2$ | 4.0 |
| $K_2O$ | 2.0 |
| As | 0.2 |
| P | 0.08 |
| Ni | 0.07 |
| Zn | 0.06 |
| Co | 0.05 |
| Cu | 0.03 |
| S | 0.02 |

Although this invention has been described with reference to certain specific and presently preferred embodiments thereof it is not limited to such described embodiments since alterations and modifications may be made therein which are within the full intended scope of this invention as defined by the appended claims.

I claim:

1. A process for recovering manganese values from low grade unreduced manganese bearing ores which comprises the steps of:
   (a) dissolving and dispersing nitrogen dioxide and water vapor in an aqueous medium;
   (b) immediately contacting and leaching with the solution of step (a) a quantity of unreduced ore which contains a stoichiometric excess of manganese dioxide in relation to the nitrous acid content of the solution of step (a), at a temperature below about 80° C. and a pH below about 4.0 under an equilibrium partial pressure of a combination of nitric oxide and water vapor less than atmospheric pressure, whereby a slurry containing manganese nitrate is obtained.

2. The process of claim 1 wherein the aqueous medium consists esseintially of an aqueous manganese nitrate solution.

3. The process of claim 1 wherein the pH is from about 0.5 to about 3.0.

4. The process of claim 1 wherein the temperature is from about 40° C. to about 50° C.

5. The process of claim 1 including the additional steps of:
(c) adjusting the pH of the slurry containing the manganese nitrate from about 4.0 to about 5.5;
(d) heating the slurry of step (c) at a temperature from about 70° C. to about 105° C. and filtering the slurry.

6. The process of claim 5 including the additional steps of:
(e) combining the solution of step (d) with manganese dioxide to form a slurry;
(f) vigorously agitating and heating the slurry at a rate of heat input controlled to decompose the manganese nitrate and provide free flowing pyrolusite crystals of manganese dioxide, nitrogen dioxide and water vapor.

7. The process of claim 6 wherein sufficient manganese dioxide is combined with the manganese nitrate solution to form a slurry having a solids content of about 5% to about 25% by weight.

8. The process of claim 6 wherein the filtered solution is concentrated to about 50% by weight of manganese nitrate prior to decomposition.

9. The process of claim 6 wherein the decomposition of the manganese nitrate solution is controlled at a rate to provide less than about 10 pounds of manganese dioxide per gallon of slurry per day.

10. The process of claim 6 wherein the decomposition rate is controlled to provide from about two to about five pounds of manganese dioxide per gallon of slurry per day.

11. A cyclic process for recovering manganese values from low grade unreduced manganese bearing ores which comprises the steps of:
(a) dissolving and dispersing nitrogen dioxide and water vapor in an aqueous medium;
(b) immediately contacting and leaching with the solution of step (a) a quantity of unreduced ore which contains a stoichiometric excess of manganese dioxide in relation to the nitrous acid content of the solution of step (a), at a temperature below about 80° C. and a pH below about 4.0 under an equilibrium partial pressure of a combination of nitric oxide and water vapor less than atmospheric pressure, whereby a slurry containing manganese nitrate is obtained;
(c) adjusting the pH of the slurry containing manganese nitrate to from about 4.0 to about 5.5;
(d) heating the slurry of step (c) at a temperature from about 70° C. to about 105° C. and filtering the solution,
(e) combining the solution of step (d) with manganese dioxide to form a slurry,
(f) vigorously agitating and heating the slurry at a rate of heat input controlled to decompose the manganese nitrate and provide free flowing pyrolusite crystals of manganese dioxide, nitrogen dioxide and water vapor, and
(g) transferring the nitrogen dioxide and water vapor of steps (f) to the aqueous medium of step (a) and dissolving and dispersing said nitrogen dioxide and water vapor in said aqueous medium.

References Cited
UNITED STATES PATENTS

| | | | |
|---|---|---|---|
| 1,287,041 | 12/1818 | Kaplan | 423—605 |
| 1,293,461 | 2/1919 | Kaplan | 423—605 |
| 1,761,133 | 6/1930 | Surry | 423—50 |
| 2,374,674 | 5/1945 | Fox et al. | 423—605 |
| 2,681,268 | 6/1954 | Nossen | 423—50 |
| 2,737,441 | 3/1956 | Nossen | 75—121 X |
| 2,779,659 | 1/1957 | Koslor | 423—50 |
| 2,793,112 | 5/1957 | Mancke | 423—50 |
| 3,677,700 | 7/1972 | Fraser | 423—50 |

FOREIGN PATENTS

| | | | |
|---|---|---|---|
| 1,153,005 | 8/1963 | Germany | 423—50 |

OTHER REFERENCES

Fox et al.: "Bureau of Mines, Technical Paper 674," 1945.

HERBERT T. CARTER, Primary Examiner

U.S. Cl. X.R.

423—605, 50

UNITED STATES PATENT OFFICE
CERTIFICATE OF CORRECTION

Patent No. 3,780,159          Dated December 18, 1973

Inventor(s) Jay Y. Welsh

It is certified that error appears in the above-identified patent and that said Letters Patent are hereby corrected as shown below:

Column 2, end of line 23, after "to" add --oxidize any NO up to $NO_2$. The NO is stated to be--. Column 5, line 23, the "$NO_3$" should read --$NO_3^-$--; line 26, the "2HNO" should read --$2HNO_3$--; line 37, "leachig" should read --leaching--. Column 7, line 49, the heading "$^aHNO_2$" should read --$^vHNO_2$--. Column 13, line 36, "removel" should read --remove--. Column 14, line 62, cancel the entire line after "slurry" and insert --level a heavy scale will develop at, and just above,--. Column 15, line 14, "ay" should read --any--; line 72, "souce" should read --source--. Column 16, line 16, "exchanges" should read --exchanger--; line 42, "maintaining" should read --maintained--; line 57, after "consequently" insert --are economically--. Column 17, line 68, "returnel" should read --returned--.

Signed and sealed this 23rd day of April 1974.

(SEAL)
Attest:

EDWARD M. FLETCHER, JR.
Attesting Officer

C. MARSHALL DANN
Commissioner of Patents